(12) United States Patent
Bortnik et al.

(10) Patent No.: US 8,454,443 B2
(45) Date of Patent: *Jun. 4, 2013

(54) GAME ACHIEVEMENTS SYSTEM

(75) Inventors: Michal Bortnik, Seattle, WA (US);
Vincent H. Curley, Bellevue, WA (US);
James Hsi-Kai Jen, Seattle, WA (US);
James David Macauley, Bellevue, WA (US); Ling Tony Chen, Bellevue, WA (US); Steven D. Lamb, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/165,211

(22) Filed: Jun. 21, 2011

(65) Prior Publication Data
US 2011/0250959 A1 Oct. 13, 2011

Related U.S. Application Data

(63) Continuation of application No. 13/019,951, filed on Feb. 2, 2011, now Pat. No. 8,323,112, which is a continuation of application No. 12/987,871, filed on Jan. 10, 2011, now Pat. No. 8,277,325, which is a continuation of application No. 11/005,768, filed on Dec. 7, 2004, now Pat. No. 7,887,419.

(51) Int. Cl.
*A63F 9/24* (2006.01)
*A63F 13/00* (2006.01)

(52) U.S. Cl.
USPC ......... 463/43; 463/9; 463/42; 700/91; 700/92

(58) Field of Classification Search
USPC .................................... 463/9, 42, 43
See application file for complete search history.

(56) References Cited

U.S. PATENT DOCUMENTS

| 5,083,271 A | 1/1992 | Thacher et al. |
| 5,551,701 A | 9/1996 | Bouton et al. |
| 5,563,805 A | 10/1996 | Arbuckle et al. |
| 5,633,484 A | 5/1997 | Zancho et al. |
| 5,674,127 A | 10/1997 | Horstmann et al. |
| 5,708,709 A | 1/1998 | Rose |
| 5,754,176 A | 5/1998 | Crawford |

(Continued)

FOREIGN PATENT DOCUMENTS

| EP | 1520608 | 4/2005 |
| EP | 1669117 | 6/2006 |

(Continued)

OTHER PUBLICATIONS

Chinese Patent Application 200510119213.7; Final Rejection dated May 25, 2011.

(Continued)

*Primary Examiner* — Steve J Hylinski

(57) ABSTRACT

Systems and method for providing a game achievements system where players are rewarded with game achievements based on mastering certain in-game facets of the games they play. Each game achievement may be conveyed in a profile as a badge or trophy, title, description, date, etc. Players may also accumulate points based on game achievements. A display interface may be made available such that a player may see his achievements and total points, as well as those of others.

22 Claims, 5 Drawing Sheets

U.S. PATENT DOCUMENTS

| | | | |
|---|---|---|---|
| 5,768,382 A | 6/1998 | Schneier et al. | |
| 5,779,549 A | 7/1998 | Walker et al. | |
| 5,791,992 A | 8/1998 | Crump et al. | |
| 5,883,955 A | 3/1999 | Ronning | |
| 5,918,010 A | 6/1999 | Appleman et al. | |
| 5,945,988 A | 8/1999 | Williams et al. | |
| 5,970,143 A | 10/1999 | Schneier et al. | |
| 6,020,884 A | 2/2000 | MacNaughton et al. | |
| 6,024,643 A | 2/2000 | Begis | |
| 6,071,194 A | 6/2000 | Sanderson et al. | |
| 6,081,830 A | 6/2000 | Schindler | |
| 6,106,395 A | 8/2000 | Begis | |
| 6,149,519 A | 11/2000 | Osaki et al. | |
| 6,174,237 B1 | 1/2001 | Stephenson | |
| 6,200,216 B1 | 3/2001 | Peppel | |
| 6,203,432 B1 | 3/2001 | Roberts et al. | |
| 6,206,782 B1 | 3/2001 | Walker et al. | |
| 6,219,047 B1 | 4/2001 | Bell | |
| 6,226,618 B1 | 5/2001 | Downs et al. | |
| 6,256,620 B1 | 7/2001 | Jawahar et al. | |
| 6,280,328 B1 | 8/2001 | Holch et al. | |
| 6,287,201 B1 | 9/2001 | Hightower | |
| 6,293,865 B1 | 9/2001 | Kelly et al. | |
| 6,302,793 B1 | 10/2001 | Fertitta et al. | |
| 6,312,336 B1 | 11/2001 | Handelman et al. | |
| 6,322,451 B1 | 11/2001 | Miura | |
| 6,334,214 B1 | 12/2001 | Horstmann | |
| 6,343,990 B1 | 2/2002 | Rasmussen et al. | |
| 6,352,479 B1 | 3/2002 | Sparks, II | |
| 6,359,572 B1 | 3/2002 | Vale | |
| 6,425,828 B2 | 7/2002 | Walker et al. | |
| 6,508,710 B1* | 1/2003 | Paravia et al. | 463/42 |
| 6,511,377 B1 | 1/2003 | Weiss | |
| 6,544,126 B2 | 4/2003 | Sawano et al. | |
| 6,572,477 B2 | 6/2003 | Hightower | |
| 6,645,068 B1 | 11/2003 | Kelly et al. | |
| 6,648,760 B1 | 11/2003 | Nicastro | |
| 6,688,978 B1 | 2/2004 | Herman | |
| 6,699,124 B2 | 3/2004 | Suchocki | |
| 6,708,172 B1 | 3/2004 | Wong et al. | |
| 6,732,197 B1 | 5/2004 | Overy | |
| 6,742,032 B1 | 5/2004 | Castellani et al. | |
| 6,746,332 B1 | 6/2004 | Ing et al. | |
| 6,755,743 B1 | 6/2004 | Yamashita et al. | |
| 6,804,675 B1 | 10/2004 | Knight et al. | |
| 6,805,634 B1 | 10/2004 | Wells et al. | |
| 6,821,205 B2 | 11/2004 | Takahashi et al. | |
| 6,829,569 B1 | 12/2004 | Drucker et al. | |
| 6,839,435 B1 | 1/2005 | Iijima et al. | |
| 6,941,353 B1 | 9/2005 | Lane | |
| 6,979,267 B2 | 12/2005 | Leen et al. | |
| 6,996,444 B2 | 2/2006 | Ach, III | |
| 7,033,276 B2 | 4/2006 | Walker et al. | |
| 7,035,653 B2 | 4/2006 | Simon et al. | |
| 7,056,217 B1 | 6/2006 | Pelkey et al. | |
| 7,069,308 B2 | 6/2006 | Abrams | |
| 7,086,946 B2 | 8/2006 | Yoshida | |
| 7,115,033 B1 | 10/2006 | Timperley | |
| 7,192,352 B2 | 3/2007 | Walker et al. | |
| 7,207,011 B2 | 4/2007 | Mulvey et al. | |
| 7,240,093 B1 | 7/2007 | Danieli et al. | |
| 7,311,601 B2* | 12/2007 | Anderson et al. | 463/20 |
| 7,311,608 B1 | 12/2007 | Daniell et al. | |
| 7,422,521 B2 | 9/2008 | Peterson | |
| 7,424,617 B2* | 9/2008 | Boyd et al. | 713/176 |
| 7,490,286 B2 | 2/2009 | Commarford et al. | |
| 7,614,955 B2 | 11/2009 | Farnham et al. | |
| 7,621,813 B2 | 11/2009 | Bortnik et al. | |
| 7,698,178 B2* | 4/2010 | Chu | 705/28 |
| 7,730,010 B2 | 6/2010 | Kishore et al. | |
| 7,756,926 B2 | 7/2010 | Tseng et al. | |
| 7,837,561 B2 | 11/2010 | Bortnik et al. | |
| 7,883,413 B2* | 2/2011 | Paulsen | 463/29 |
| 7,887,419 B2 | 2/2011 | Bortnik | |
| 7,918,738 B2* | 4/2011 | Paulsen | 463/43 |
| 8,231,472 B2 | 7/2012 | Bortnik et al. | |
| 8,235,818 B2 | 8/2012 | Bortnik et al. | |
| 8,277,325 B2 | 10/2012 | Bortnik | |
| 2001/0010046 A1 | 7/2001 | Muyres et al. | |
| 2002/0002510 A1 | 1/2002 | Sharp et al. | |
| 2002/0023230 A1 | 2/2002 | Bolnick et al. | |
| 2002/0035568 A1 | 3/2002 | Benthin et al. | |
| 2002/0049507 A1 | 4/2002 | Hameen-Anttila | |
| 2002/0062316 A1 | 5/2002 | Maehiro | |
| 2002/0062350 A1 | 5/2002 | Maehiro | |
| 2002/0082077 A1 | 6/2002 | Johnson et al. | |
| 2002/0082086 A1 | 6/2002 | Scallie | |
| 2002/0082939 A1 | 6/2002 | Clark et al. | |
| 2002/0083145 A1 | 6/2002 | Perinpanathan | |
| 2002/0090996 A1 | 7/2002 | Maehiro | |
| 2002/0094851 A1* | 7/2002 | Rheey | 463/1 |
| 2002/0115488 A1 | 8/2002 | Berry et al. | |
| 2002/0119824 A1 | 8/2002 | Allen | |
| 2002/0142842 A1 | 10/2002 | Easley et al. | |
| 2002/0151366 A1 | 10/2002 | Walker et al. | |
| 2002/0173349 A1* | 11/2002 | Ach, III | 463/1 |
| 2002/0198949 A1 | 12/2002 | Maehiro | |
| 2003/0009549 A1 | 1/2003 | Maehiro | |
| 2003/0043179 A1 | 3/2003 | Gusler et al. | |
| 2003/0045358 A1 | 3/2003 | Leen et al. | |
| 2003/0050115 A1 | 3/2003 | Leen et al. | |
| 2003/0070176 A1 | 4/2003 | Parker et al. | |
| 2003/0100363 A1 | 5/2003 | Ali | |
| 2003/0104868 A1 | 6/2003 | Okita et al. | |
| 2003/0109301 A1 | 6/2003 | Chudley | |
| 2003/0109305 A1 | 6/2003 | Gavin et al. | |
| 2003/0181242 A1 | 9/2003 | Lee et al. | |
| 2003/0216962 A1 | 11/2003 | Heller et al. | |
| 2004/0087373 A1 | 5/2004 | Choi | |
| 2004/0088325 A1 | 5/2004 | Elder et al. | |
| 2004/0097287 A1* | 5/2004 | Postrel | 463/41 |
| 2004/0107283 A1 | 6/2004 | Paddon | |
| 2004/0121835 A1 | 6/2004 | Willis et al. | |
| 2004/0172533 A1 | 9/2004 | Demello et al. | |
| 2004/0192440 A1 | 9/2004 | Evans et al. | |
| 2004/0198497 A1 | 10/2004 | Yamashita et al. | |
| 2004/0225386 A1 | 11/2004 | Thompson et al. | |
| 2004/0229698 A1 | 11/2004 | Lind et al. | |
| 2004/0242327 A1* | 12/2004 | Shahar | 463/42 |
| 2004/0259641 A1 | 12/2004 | Ho | |
| 2005/0049037 A1* | 3/2005 | Anderson et al. | 463/25 |
| 2005/0054431 A1 | 3/2005 | Walker et al. | |
| 2005/0070359 A1 | 3/2005 | Rodriquez et al. | |
| 2005/0071786 A1 | 3/2005 | Mariani et al. | |
| 2005/0130742 A1 | 6/2005 | Feldman et al. | |
| 2005/0137014 A1 | 6/2005 | Vetelainen | |
| 2005/0137015 A1* | 6/2005 | Rogers et al. | 463/42 |
| 2005/0143174 A1* | 6/2005 | Goldman et al. | 463/42 |
| 2005/0154557 A1 | 7/2005 | Ebert | |
| 2005/0170873 A1 | 8/2005 | Fishbach et al. | |
| 2005/0192097 A1 | 9/2005 | Farnham et al. | |
| 2005/0209002 A1 | 9/2005 | Blythe et al. | |
| 2005/0240603 A1 | 10/2005 | Bodin et al. | |
| 2005/0245314 A1 | 11/2005 | Pirich et al. | |
| 2005/0246638 A1 | 11/2005 | Whitten | |
| 2005/0261062 A1 | 11/2005 | Lewin et al. | |
| 2005/0282636 A1 | 12/2005 | O'Brien | |
| 2006/0048132 A1 | 3/2006 | Chen et al. | |
| 2006/0052168 A1 | 3/2006 | Shacham | |
| 2006/0064761 A1 | 3/2006 | Multerer et al. | |
| 2006/0075019 A1 | 4/2006 | Donovan et al. | |
| 2006/0085642 A1 | 4/2006 | Multerer et al. | |
| 2006/0121987 A1 | 6/2006 | Bortnik et al. | |
| 2006/0121991 A1 | 6/2006 | Bortnik et al. | |
| 2006/0122716 A1 | 6/2006 | Bortnik et al. | |
| 2006/0136964 A1 | 6/2006 | Diez et al. | |
| 2006/0172799 A1 | 8/2006 | Kane et al. | |
| 2006/0183542 A1 | 8/2006 | Ng et al. | |
| 2006/0191016 A1 | 8/2006 | Ostergren et al. | |
| 2006/0196686 A1 | 9/2006 | Gatto et al. | |
| 2006/0258463 A1 | 11/2006 | Cugno et al. | |
| 2007/0111794 A1 | 5/2007 | Hogan et al. | |
| 2007/0117629 A1 | 5/2007 | Fowler et al. | |
| 2007/0173321 A1 | 7/2007 | Shen et al. | |
| 2007/0173327 A1 | 7/2007 | Kilgore et al. | |
| 2007/0191097 A1 | 8/2007 | Johnson | |
| 2008/0113789 A1 | 5/2008 | Canessa et al. | |

| | | | |
|---|---|---|---|
| 2009/0231515 | A1 | 9/2009 | Keam et al. |
| 2011/0045912 | A1 | 2/2011 | Bortnik et al. |
| 2011/0118035 | A1 | 5/2011 | Bortnik |
| 2011/0136575 | A1 | 6/2011 | Bortnik |
| 2012/0009999 | A1 | 1/2012 | Bortnik et al. |

FOREIGN PATENT DOCUMENTS

| | | |
|---|---|---|
| JP | 09-152999 | 6/1997 |
| JP | 2001-109714 | 4/2001 |
| JP | 2001-212366 | 8/2001 |
| JP | 2002-085852 | 3/2002 |
| JP | 2002-210246 | 7/2002 |
| JP | 2002-239251 | 8/2002 |
| JP | 2003-047778 | 2/2003 |
| JP | 2003-111980 | 4/2003 |
| JP | 2003-154172 | 5/2003 |
| JP | 2003-205175 | 7/2003 |
| JP | 2003-271780 | 9/2003 |
| JP | 2003-281142 | 10/2003 |
| JP | 2003-337874 | 11/2003 |
| JP | 2003-340161 | 12/2003 |
| JP | 2004-097610 | 4/2004 |
| JP | 2004-329914 | 11/2004 |
| KR | 2000/0030338 | 6/2000 |
| KR | 2001/0082566 | 8/2001 |
| KR | 2005/0003224 | 1/2005 |
| KR | 2005/0105396 | 11/2005 |
| WO | WO00/04458 | 1/2000 |
| WO | WO2005/092458 | 10/2005 |

OTHER PUBLICATIONS

U.S. Appl. No. 11/005,674, Including O/As of Jun. 23, 2008; Jan. 29, 2009; Dec. 2, 2009; Sep. 15, 2010; and any future O/As.
U.S. Appl. No. 11/006,118, Including O/As of Jun. 26, 2007; Dec. 11, 2007; Aug. 8, 2008; Jan. 29, 2009; Jun. 30, 2009; Dec. 24, 2009; Jul. 8, 2010; Dec. 10, 2010; Jun. 10, 2011; Nov. 25, 2011.
U.S. Appl. No. 11/006,275, Including O/As dated May 19, 2008; Nov. 7, 2008; Apr. 2, 2009; and Jul. 13, 2009.
U.S. Appl. No. 12/578,605, Including O/As dated Mar. 1, 2010; and Jul. 21, 2010.
U.S. Appl. No. 12/916,246, Including O/A dated Mar. 28, 2012 and any future O/As.
U.S. Appl. No. 13/240,454, Including O/A dated Mar. 26, 2012 and any future O/As.
EP05110463.6, Including O/A dated Jan. 10, 2007 and any future O/As.
JP2005-319924, Including O/A dated Jun. 3, 2011 and any future O/As.
KR10-2005-97991, Including O/A dated Mar. 30, 2012 and any future O/As.
U.S. Appl. No. 11/005,768, Including O/As dated Apr. 16, 2008; Dec. 10, 2008; Aug. 10, 2009; Mar. 25, 2010; Oct. 21, 2010.
U.S. Appl. No. 12/987,871, Including any future O/As.
U.S. Appl. No. 13/019,951, Including any future O/As.
EP05110418.0, Including O/A dated Feb. 19, 2007.
CN200510119213.7, Including O/As dated Feb. 6, 2009; Oct. 9, 2009; Feb. 12, 2010; Jul. 29, 2010; and any future O/As (and English translations).
JP2005-311712, Including O/A (English translation only) dated Jun. 3, 2011 and any future O/As.
"Tiger Woods PGA Tour 2004"; copyright 2003.
EP Patent Application 05110418.0; Office Action dated Feb. 19, 2007.
CN Patent Application 200510119213.7; Office Actions dated Feb. 6, 2009; Oct. 9, 2009; Feb. 12, 2010; and Jul. 29, 2010.
JP Patent Application 2005-311712; Office Action dated Jun. 3, 2011.
CN200510119213.7, Including O/A dated May 25, 2011 (and English translation); and any future O/As.
Abrash, M.; "Inside Xbox Graphics—A Powerful Game Platform Waiting in the Wings"; drdobbs.com; retrieved at http://www.drdobbs.com/184404199; Aug. 1, 2000; 9 pages.
Akkawi, A. et al.; "A Mobile Gaming Platform for the IMS"; Network and System Support for Games; Proceedings of $3^{rd}$ ACM SIGCOMM Workshop on System Support for Games; 2004; 8 pages.
Henshaw, J.; "Inside Xbox 360: An Interview with Jeff Henshaw"; Interview by Paul Thurrott; Paul Thurrott's Supersite for Windows; retrieved at http://www.winsupersite.com/showcase/xbox360_inside.asp; Jun. 21-Jul. 7, 2005; 12 pages.
Huang, A.; "Keeping Secrets in Hardware: the Microsoft XBox™ Case Study"; AI Memo 2002-008; Massachusetts Institute of Technology—Artificial Intelligence Laboratory; Cambridge, MA; May 26, 2002; 15 pages.
Larocque, D.; "State Pattern in C++ Applications"; Codeguru.com; retrieved at http://www.codeguru.com/cpp/misc/misc/article.php/c3893; Sep. 17, 2001; 2 pages.
Suwalski, P; "Automotive Computing with Game Console Hardware"; Department of Systems and Computer Engineering at Carleton University; Ottawa, Ontario, Canada; Apr. 2005; 58 pages.
EP Application 05110463.6; Search Report dated Feb. 28, 2006; 8 pages.
JP Application 05110463.6; Examination Report dated Jan. 10, 2007; 6 pages.
JP Application 2005-319924; Notice of Rejection dated Jun. 3, 2011; 5 pages.
KR Application 10-2005-97991; Notice of Preliminary Rejection dated Mar. 29, 2012; 6 pages.
U.S. Appl. No. 13/019,951, Including O/A dated Jul. 17, 2012 and any future O/As.
Japanese Patent Appln. 2005-311712; Second Office Action dated Aug. 31, 2012; 4 pages.
Japanese Patent Appln. 2005-319924; Second Office Action dated Aug. 10, 2012; 3 pages.

* cited by examiner

Fig. 6

Game Achievement Configuration

Please edit the Achievement list for your title
and assign relative weights.

| Prio | Achievement Title | Relative Weight | Gamer Cred |
|---|---|---|---|
| 1 | Campaign Completed on Hardest | 10 | 28 (27.8) |
| 2 | Multiplayer Level 10 | 8 | 22 (22.2) |
| 3 | Campaign Completed | 7 | 19 (19.4) |
| 4 | Explored 95% of all Maps | 5 | 14 (13.9) |
| 5 | Played every Map/Mode combination | 3 | 8 (8.33) |
| 6 | Completed the 1st stage of Campaign | 2 | 6 (5.56) |
| 7 | Won a multiplayer session | 1 | 3 (2.78) |
| 8 | Unlocked a Weapon | 0 | 0 |
| 9 | Killed One Enemy | 0 | 0 |
| 8 | Created a profile | 0 | 0 |

Total 36    Total 100

[Add New]  [Done]

GAME ACHIEVEMENTS SYSTEM

CROSS-REFERENCE TO RELATED APPLICATIONS

This patent application is a continuation of, and claims priority from, U.S. patent application Ser. No. 13/019,951 filed on Feb. 2, 2011. This application is also a continuation of, and claims priority from, U.S. patent application Ser. No. 12/987,871 filed on Jan. 10, 2011. U.S. patent application Ser. No. 13/019,951 is a continuation of U.S. patent application Ser. No. 12/987,871, which is a continuation of, and claims priority from, U.S. patent application Ser. No. 11/005,768 filed on Dec. 7, 2004, now U.S. Pat. No. 7,887,419 issued Feb. 15, 2011, all of which are incorporated herein by reference in their entirety.

COPYRIGHT NOTICE/PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright© 2004, Microsoft Corporation, All Rights Reserved.

FIELD OF THE INVENTION

This invention generally relates to the field of gaming and multimedia devices. In particular, the present invention is directed to a system and method of defining and creating game achievements that may be used to convey a player's skill.

BACKGROUND OF THE INVENTION

Conventional gaming systems include a concept of unique identity, which was intended to increase player satisfaction and create a sense of community. However, while the conventional unique identity does minimize the effort required to play online, the unique identity failed to accomplish these goals. One reason for this problem is that multiple players often share an identity because there is no easy way for multiple players to identify themselves on a shared gaming device. This creates confusion as a player using a particular identity during an online gaming session, may not be the same player in the next session or from the previous session.

Further, conventional identities have failed to provide a method for conveying information about players other than a limited set of game achievements and fail to convey information about offline achievements. Thus, it is difficult to learn more about a player through the conventional unique identity. Therefore, there is a need for a unique identity that is rich and includes game achievements from both offline and online contexts to convey a player's skill. Further, the achievements should be weighted such that excelling in more difficult games results in a higher achievement level. The present invention provides such a solution.

SUMMARY OF THE INVENTION

The present invention is directed to a system and methods for providing a game achievements system. In accordance with the present invention, players are rewarded with game achievements based on mastering certain in-game facets of the games they play. Each game achievement may be conveyed in a profile as a badge or trophy, title, description, date, etc. Players may also accumulate points based on game achievements. A display interface may be made available such that a player may see his achievements and total points, as well as those of others.

In accordance with an aspect of the invention, there is provided a method of providing a game achievements system in an online gaming environment. The method includes defining system achievements; receiving definitions of predetermined in-game achievements; tracking player activity to capture occurrences of the system achievements and the predetermined in-game achievements; and aggregating occurrences of the system achievements and the predetermined in-game achievements during game play into a profile associated with a user.

In accordance with features of the invention, the method may include assigning a predetermined number of points to each system achievement, aggregating the predetermined number of system achievement points into the profile, and maintaining an aggregate number of points for the profile. Also, the method may include assigning a predetermined number of points to each in-game achievement, and aggregating the predetermined number of in-game achievement points into the profile.

In accordance with the invention, the predetermined number of points may be a weighted valued based on a total number of points available. Further, the total number of points assigned to in-game achievements for a specified game may be determined in accordance with a difficulty of the specified game. However, it may be desirable to fix the total number of points assigned to the system achievements for all games.

A display user interface may be provided where the profile is published for viewing. The display may show the aggregate number of points within a profile.

In accordance with another aspect of the invention, there is provided a system for providing game achievements in an online gaming environment. The system includes an offline player achievement tracking mechanism that tracks offline player activity during periods when a player is not communicatively connected to the online gaming environment, an online player achievement tracking mechanism that tracks online player activity during online sessions with the online gaming environment, and an aggregation mechanism that receives data regarding offline player activity and the online player activity and aggregates the offline player activity and the online player activity into a player profile.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 6 illustrates a developer user interface to specify in-game achievements.

DETAILED DESCRIPTION OF ILLUSTRATIVE EMBODIMENTS

Figure 1:
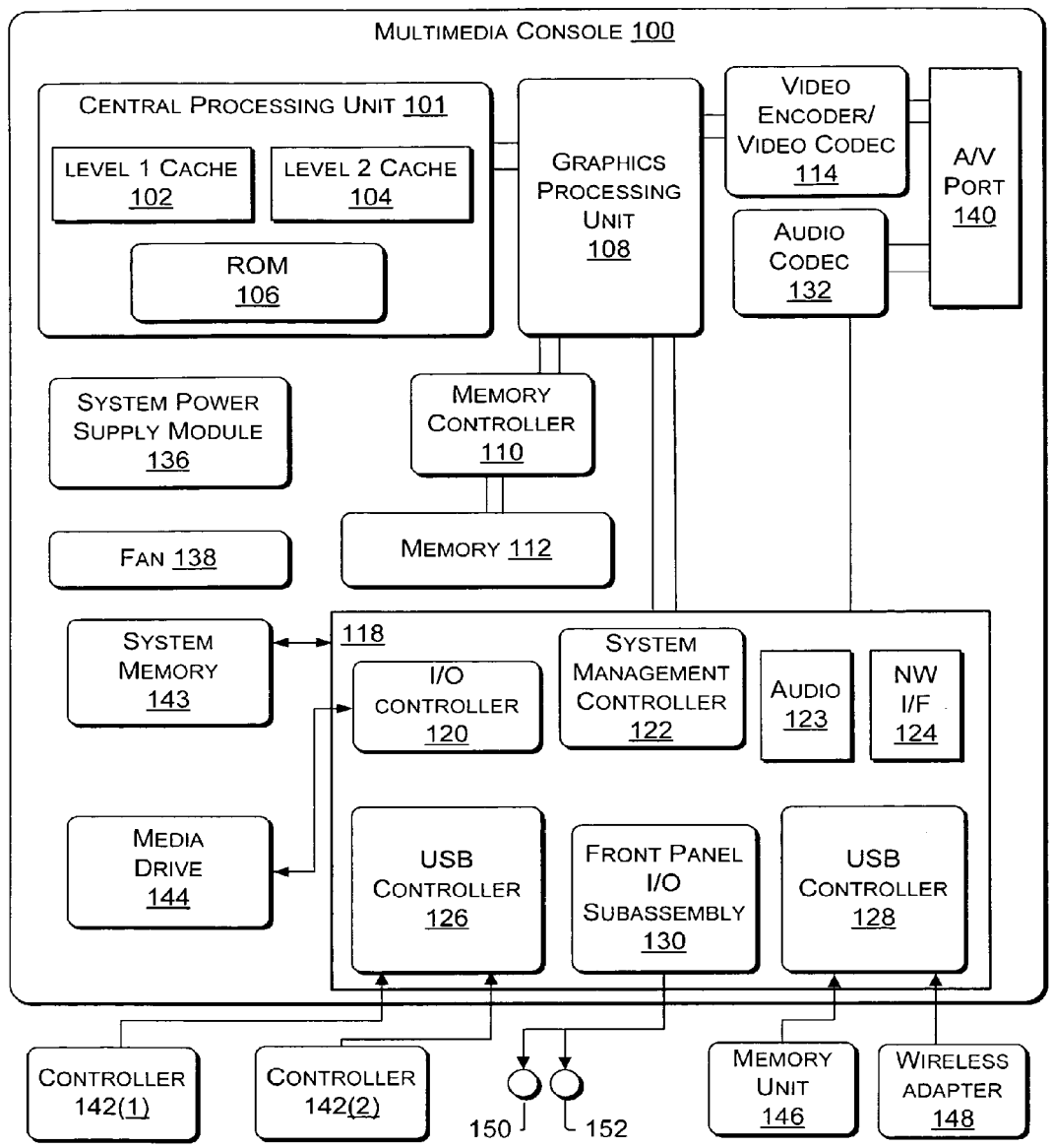
FIG. 1 is a block diagram showing a gaming console in which aspects of the present invention may be implemented.

FIG. 1 illustrates the functional components of a multimedia/gaming console 100 in which certain aspects of the present invention may be implemented. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches.

The present invention is directed to a "Gamer Profile," which serves as a building block for services and applications that aim to create a social community of gamers and grow relationships among players. In accordance with the present invention, the Gamer Profile is the entirety of information (e.g., metadata) related to a specific user (i.e., the gamer's digital identity). The Gamer Profile is developed from a set of services that collect and expose this information in a meaningful way to the community. The Gamer Profile also provides for personalization such that users can customize and enhance their gaming experience. As will be discussed in greater detail below, the Gamer Profile consists of various components, including, but not limited to, a Gamercard, game achievements, and gamer preferences.

Figure 2:
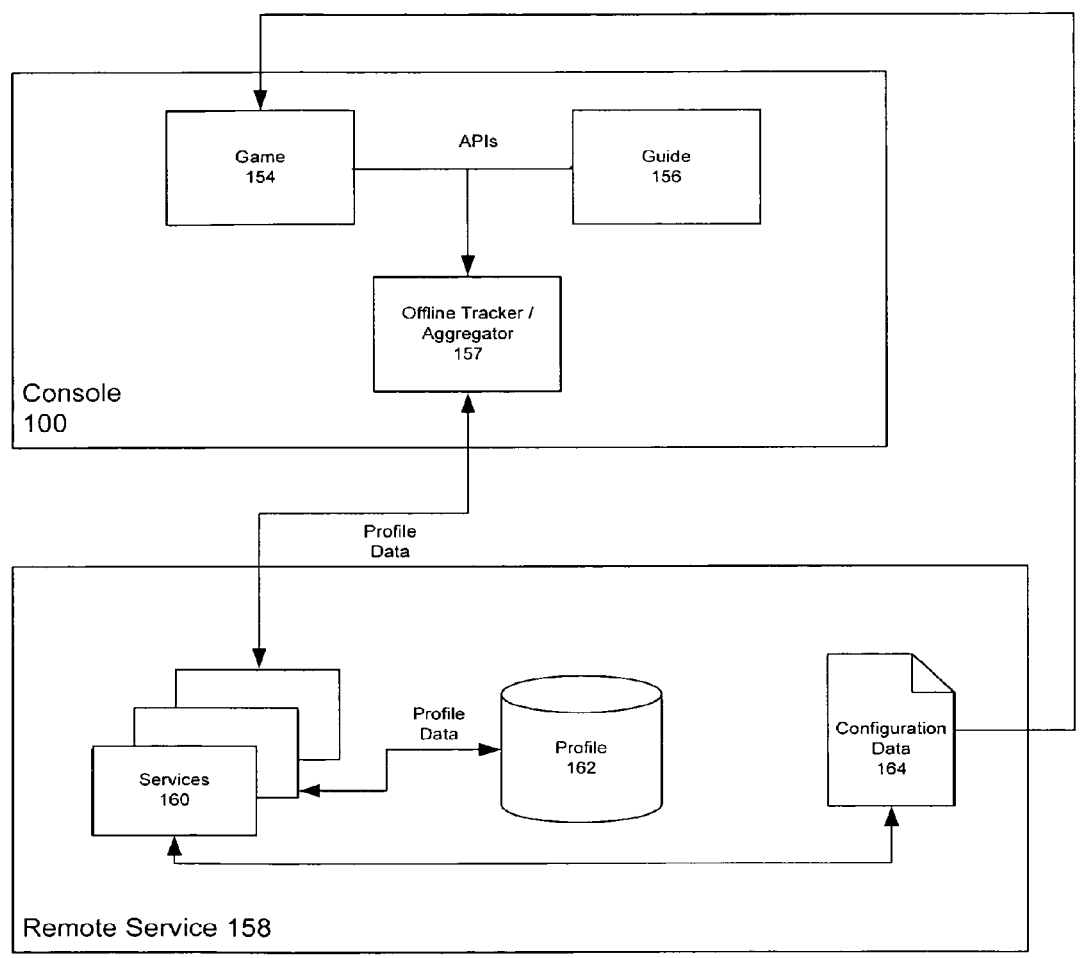
FIG. 2 illustrates an exemplary architecture in which the present invention may be implemented.

Referring to FIG. 2, there is an exemplary architecture that may be used to implement the Gamer Profile. The console 100 interacts with a remote service 158 that provides services 160 such as voice/chat, a friends list, matchmaking, content download, roaming, feedback, tournaments, voice messaging, and updates to games. The service 158 also maintains the Gamer Profiles in a profile database 162 and configuration data 164 used by the services 160 and games 154. The service 158 collects Gamer Profiles, aggregates, processes information supplied by other services 160, and fulfills real-time client requests for retrieving Gamer Profile-related services. The Gamer Profiles in the database 162 are also used by the games 154 to enable, among other things, personalization and customization, etc.

Using the console 100, the user may interact with a guide 156. The guide 156 provides an interface where the user may navigate to, and enter, various online areas and options provided by the service 158. The configuration data 164 stored by the service 158 may be used to determine features and options provided by the guide 156. When the game 154 is running, a defined set of APIs are used to call and interact with the services 160. When requesting Gamer Profile information via the APIs, the game 154 may pass a unique identifier of a user. The service 158 may return a Gamercard (discussed below), game stats, game achievements, affiliations, game settings. etc. Additional details of the various aspects of the exemplary architecture are provided below.

The console 100 includes an offline tracking mechanism 157 that tracks offline player activity during periods when a player is not communicatively connected to the service 158. The tracker/aggregator 157 tracks offline player activity during offline sessions and aggregates that data with the online player activity into the Gamer Profile 166.

Figure 3:
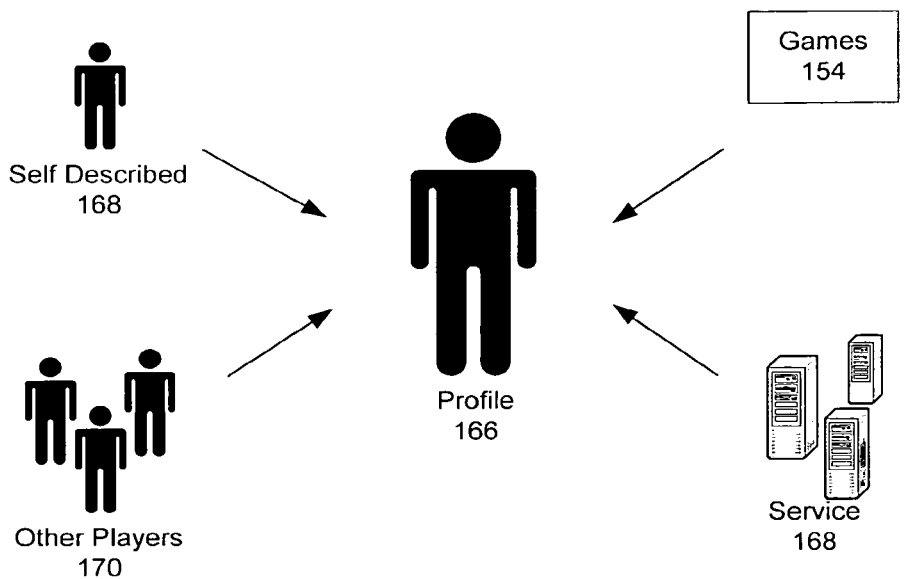
FIG. 3 illustrates sources of information that provide input to a Gamer Profile.

Referring to FIG. 3, the Gamer Profile 166 is created when a user creates a profile (selected from the guide 156) and chooses his/her unique Gamertag (a user's unique name), tile (picture/avatar associated with the user) other options during an account sign-up phase. From there, a base Gamer Profile 166 is created. The Gamer Profile 166 may then be populated from several sources. For example, the Gamer Profile 166 may include self-described data 168 from the Gamer Profile owner. Other gamers 170 can provide feedback regarding the Gamer Profile owner. The service 158 may track the gamer's online and offline activity. In addition, the games 154 may report the gamer's statistics and game achievements.

The owner of Gamer Profile can edit his/her Gamer Profile 166 directly and control who can view each section of the Gamer Profile. The Gamer Profile 166 may be edited via general fields (e.g., tile, country, language, gender, greeting, etc.) and/or system settings (e.g., voice output, controller vibration, character name, game format, game mode, etc.). Privacy/Opt-out Settings can be tuned for the Gamer Profile to, e.g., restrict presence information only to friends, allow game achievements to be visible to all, etc.

The Gamer Profile 166 may include feedback provided by other players 170. Feedback helps others learn about a particular gamer. For example, if the gamer uses foul language or aggressive play in game sessions, other gamers may submit feedback to the service 158. The feedback mechanism improves the user experience by building reputations. Players are therefore anonymous, but not unknown because of the accumulated feedback.

As noted above the Gamer Profile 166 may be used for customization and preference setting on a global level, as well as a per game level. Gamer preferences aid games 154 in choosing defaults for common settings such as game profile name, controller inversion and controller vibration, etc. For example, if a gamer likes using an inverted controller, this preference will be used for new titles as they are played. Games 154 have access to Gamer Profiles via the database 162 and services 160. In addition, game usage data can be mined to tune the game 154 to the user's particular preferences and game features updated after the initial game launch.

Figure 4:
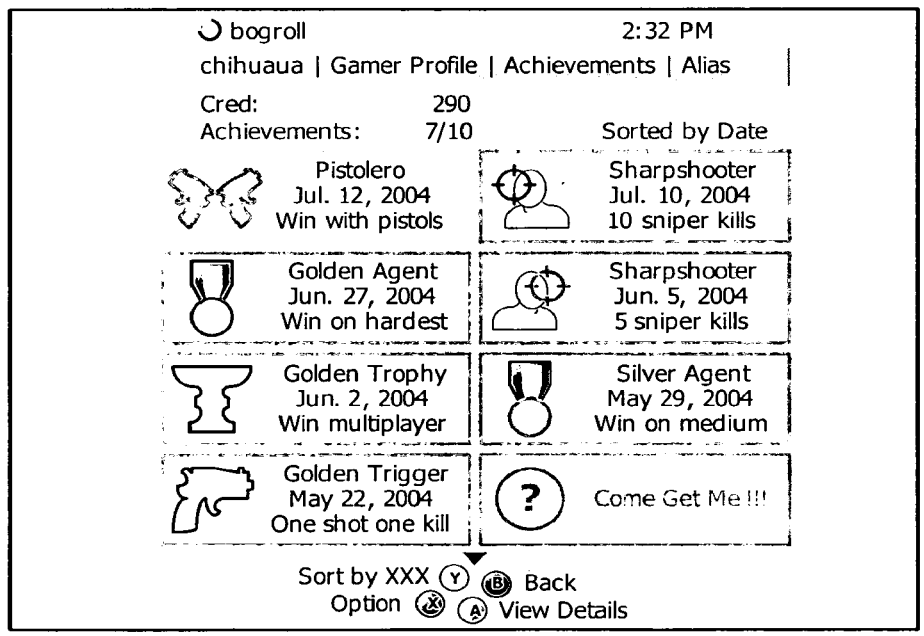
FIG. 4 illustrates an exemplary game achievements display user interface configuration.

As noted above, the Gamer Profile 166 conveys, among other things, game achievements. Players will be rewarded with game achievements based mastering certain in-game facets of the games they play. Each game achievement may be conveyed in the Gamer Profile 166 as, e.g., a badge or trophy, title, description, date, etc., as shown in FIG. 4. Games may supply a screen snapshot or some other rich media captured at the moment the player earned a given achievement. This too may be displayed as part of the Gamer Profile 166. Players will accumulate gamer Cred (a points-based reward system) based on game achievements. As shown in FIG. 4, the player has a gamer Cred of 290. The display interface of FIG. 4 may be made available within the console 100 or via, e.g., a web browser, etc.

Figure 5:
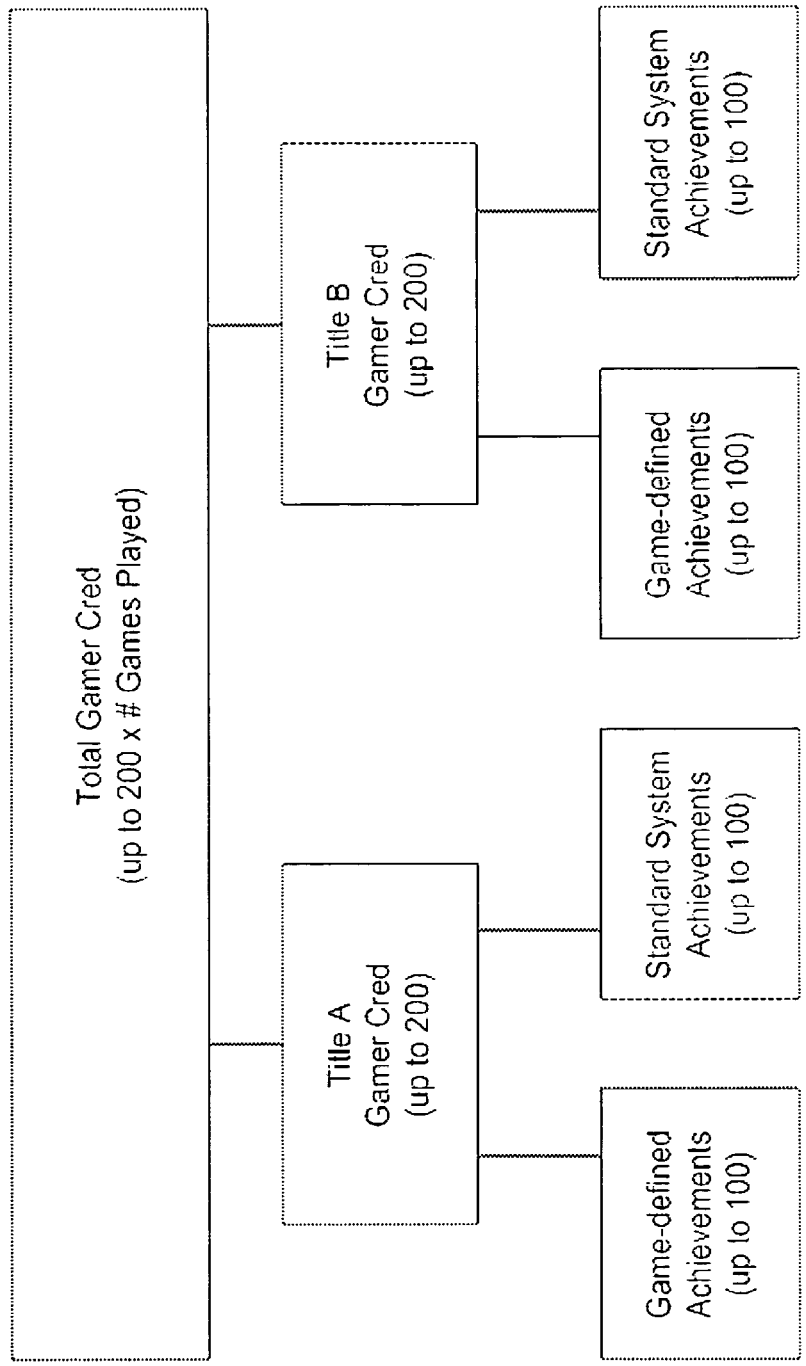
FIG. 5 illustrates the aggregation of game achievements.

Referring to FIG. 5, there is illustrated the overall relationship of the game achievements and gamer Cred in accordance with the present invention. The player's total gamer Cred is an aggregation of gamer Cred awarded through the play of one or more games (e.g., Title A and Title B). Each game may award up to a certain amount of game Cred (e.g., 200) that is divided into game-defined achievements and standard system achievements.

For example, referring to the user interface FIG. 6, Title A may be a relatively easy game to master and may award a total of 100 game-defined gamer Cred points. Within Title A, there may be several achievements (e.g., Campaign completed on hardest, multiplayer level 10, etc.) The relative weight of each of the achievements is set based on the total weight (e.g., Campaign completed on hardest is $^{10}/_{36}$ or 27.8%). If a player completes this achievement, then the player may be awarded 27.8% of the 100 total gamer Cred points, or 28, rounded to the nearest integer value. A player is preferably credited with an achievement only once.

The standard system achievements make up the remaining 100 points in the exemplary embodiment. The standard system achievements may be applied to all games. They may include achievements such as a first sign-in to a title, completing a first session with a game, completing a first hour of a game, completing 100 sessions with a game, completing 10 hours with a game, completing a game, etc. Other system achievements may be defined as necessary. The system achievements may be weighted such that a first sign-in is awarded a relative few points, whereas completing 100 sessions is awarded a higher number points.

Developers may use a tool that include user interface of FIG. 6 to describe their game. The tool may create a configuration file that a system application on the console 100 reads when the game is loaded, a C++ header file that game code can compile against, and an XML file that is used for configuration, creation of tables, creation stored procedures, and creation of leader boards.

Although Title A and Title B can award 200 gamer Cred points, more difficult games may award 500 or 1000 (or some other number) of gamer Cred points. The total amount to be awarded on a per game basis is preferably set by the online service 158 and is not editable by the developers. This will maintain fairness and avoid the situation where Game X wants to increase sales by making the total number of gamer Cred points available a significantly higher number than other games.

Thus, the present invention provides a balanced game achievements system by weighting the difficulty of the achievements and the games. In addition, because the aggregation of game Cred is abstracted from the game to the console 100, the likelihood that a hacker or developer can overvalue achievements to inflate a player's gamer Cred is reduced.

While the present invention has been described in connection with the preferred embodiments of the various Figs., it is to be understood that other similar embodiments may be used or modifications and additions may be made to the described embodiment for performing the same function of the present invention without deviating therefrom.

What is claimed:

1. A method comprising:
    configuring a game to report occurrences of a plurality of achievements while the game is being played on a device by a user, wherein the configuring is performed responsive to inputs to a developer user interface, the inputs determining at least:
        a first title for a first individual achievement,
        a second title for a second individual achievement,
        a first number of points to credit to the user when the user completes the first individual achievement, and
        a second number of points to credit to the user when the user completes the second individual achievement;
    identifying at least an occurrence of the first individual achievement and an occurrence of the second individual achievement while the game is being played by the user; and
    reporting the occurrence of the first individual achievement and the occurrence of the second individual achievement from the game to a service that aggregates at least the occurrence of the first individual achievement and the occurrence of the second individual achievement into a profile associated with the user by awarding the first number of points for the occurrence of the first individual achievement and the second number of points for occurrence of the second individual achievement,
    wherein the configuring, the identifying, and the reporting are performed by the one or more processing units.

2. The method of claim 1, further comprising providing the inputs to the developer user interface.

3. The method according to claim 2, wherein the first number of points is different than the second number of points.

4. The method according to claim 3, wherein the first individual achievement comprises completing a stage of a game campaign and the second individual achievement comprises completing the entire game campaign.

5. The method according to claim 4, wherein the first number of points which is awarded for completing the stage of the game campaign is lower than the second number of points which is awarded for completing the entire game campaign.

6. The method according to claim 1, wherein configuring the game to report the occurrences of the plurality of achievements comprises including, in the game, calls to a defined set of application program interfaces that interact with the service.

7. The method according to claim 1, wherein the service limits a total number of points that can be awarded to the profile via game play of the game.

8. The method according to claim 7, wherein the service limits points awarded via game play of at least one other game to the same total number of points.

9. The method according to claim 1, further comprising:
    interacting with a graphical interface by editing the first number of points, the second number of points, the first title for the first individual achievement, and the second title for the second individual achievement.

10. The method according to claim 1, wherein the service is located remotely from the device on which the game is played.

11. One or more computer readable storage devices having stored thereon computer executable instuctions which, when executed by the one or more processing units, cause the one or more processing units to perform the method of claim 1.

12. The method according to claim 1, further comprising displaying the developer user interface to a developer that provides the inputs.

13. The method according to claim 1, wherein the inputs are user inputs that edit the first title for the first individual achievement, the second title for the second individual achievement, the first number of points, and the second number of points.

14. A method implemented at least in part by one or more processing units, the method comprising:
    providing a mechanism for a game developer to configure point values that are associated with achievements during game play of a game, the point values including at least a first point value associated with a first individual achievement and a second point value associated with a second individual achievement;
    receiving, from the game, a report of an occurrence of the first individual achievement and a report of an occurrence of the second individual achievement during game play of the game by a user;
    awarding the first point value associated with the first individual achievement and the second point value associated with the second individual achievement to a profile associated with the user up to a total number of awardable points for the game;

preventing the game developer from editing the total number of awardable points for the game; and publishing the profile for viewing by the user or another user, wherein at least the awarding is performed by the one or more processing units.

15. The method according to claim 14, the mechanism comprising an interface that reflects at least a first editable title for the first individual achievement and a second editable title for the second individual achievement.

16. The method according to claim 15, the interface including a first field for setting the first point value and a second field for setting the second point value.

17. The method according to claim 16, the interface reflecting a weight of the first point value relative to the total number of awardable points for the game.

18. The method according to claim 15, the interface comprising a graphical interface.

19. The method according to claim 14, wherein at least the report of the occurrence of the first individual achievement is received remotely from a device that executes the game.

20. One or more computer readable storage devices having stored thereon computer executable instructions which, when executed by the one or more processing units, cause the one or more processing units to perform the method of claim 14.

21. A method implemented at least in part by one or more processing units, the method comprising:
- identifying, via a developer user interface, a plurality of achievements that are achievable via game play of a game on a device by a user, the identifying comprising entering at least a first title for a first individual achievement and a second title for a second individual achievement into the developer user interface;
- editing, via the developer user interface, a first number of points to credit to the user when the user completes the first individual achievement;
- editing, via the developer user interface, a second number of points to credit to the user when the user completes the second individual achievement; and
- configuring game code of the game to report occurrences of the first individual achievement and occurrences of the second individual achievement from the game to a remote service, wherein at least the configuring is performed by the one or more processing units.

22. The method of claim 21, wherein the editing the first number of points comprises entering a relative weight for the first individual achievement into the developer user interface.

\* \* \* \* \*